(12) United States Patent
Boenders

(10) Patent No.: US 7,855,736 B2
(45) Date of Patent: Dec. 21, 2010

(54) METHOD, CIRCUIT ARRANGEMENT AND CAMERA FOR PROVIDING ELECTRONIC SCAN REVERSAL

(75) Inventor: Paulus Boenders, Oosterhout (NL)

(73) Assignee: Thomson Licensing, Boulogne-Billancourt (FR)

( * ) Notice: Subject to any disclaimer, the term of this patent is extended or adjusted under 35 U.S.C. 154(b) by 1334 days.

(21) Appl. No.: 11/362,684

(22) Filed: Feb. 27, 2006

(65) Prior Publication Data

US 2006/0197770 A1 Sep. 7, 2006

(30) Foreign Application Priority Data

Mar. 2, 2005 (EP) .................................. 05300160

(51) Int. Cl.
*H04N 5/76* (2006.01)
*H04N 5/225* (2006.01)
*G06F 15/167* (2006.01)
*G06F 12/02* (2006.01)
*G06F 12/06* (2006.01)

(52) U.S. Cl. .................. 348/231.99; 348/360; 345/541; 345/566; 345/574

(58) Field of Classification Search ............ 348/231.99, 348/335, 340, 360; 345/531, 541, 566, 565, 345/572, 573, 574
See application file for complete search history.

(56) References Cited

U.S. PATENT DOCUMENTS

| | | | | |
|---|---|---|---|---|
| 4,134,135 | A | | 1/1979 | Inokuchi et al. |
| 4,807,044 | A | | 2/1989 | Kikuchi et al. |
| 4,869,237 | A | | 9/1989 | Eino et al. |
| 5,550,588 | A | * | 8/1996 | Hayashi .................. 348/231.99 |
| 5,629,741 | A | * | 5/1997 | Hopper ........................ 348/578 |
| 5,966,164 | A | * | 10/1999 | Gotoh et al. ............. 348/14.01 |
| 5,969,773 | A | * | 10/1999 | Im ............................. 348/714 |
| 6,127,999 | A | * | 10/2000 | Mizutani .................... 345/619 |
| 6,697,115 | B1 | * | 2/2004 | Amano ........................ 348/360 |
| 2005/0248585 | A1 | * | 11/2005 | Inoue et al. ................. 345/619 |

FOREIGN PATENT DOCUMENTS

| | | | | |
|---|---|---|---|---|
| EP | 1 014 705 | A2 | | 6/2000 |
| JP | 06022224 | A | * | 1/1994 |
| JP | 06225299 | A | * | 8/1994 |
| JP | 07152905 | A | * | 6/1995 |
| JP | 10224683 | A | * | 8/1998 |
| JP | 2005277662 | A | * | 10/2005 |

OTHER PUBLICATIONS

Search Report, Aug. 17, 2005.

* cited by examiner

*Primary Examiner*—John M Villecco
(74) *Attorney, Agent, or Firm*—Robert D. Shedd; Robert B. Levy

(57) ABSTRACT

Method for reversing a video signal having sequences of n elements comprises the steps of writing the n elements of a first sequence into memory locations of a memory in a non-reversed order and reading out the memory locations in a reversed order, and in a subsequent step, writing the n elements of a second sequence into the memory locations in a reversed order and reading out the memory locations in a non-reversed order. The memory locations are readout from the memory in particular one element ahead of the write locations of the memory. A method of this kind can be used in particular in a television camera comprising a lens unit, which is designed for film applications.

12 Claims, 2 Drawing Sheets

| Input | | Write loc. | READ loc. | Output | Value | |
|---|---|---|---|---|---|---|
| | | | | | ? | |
| I1 | (S1) | A1 | | | ? | |
| I2 | (S1) | A2 | | | ? | |
| I... | (S1) | A.... | | | ? | |
| In-1 | (S1) | An-1 | | | ? | |
| In | (S1) | An | | | | |
| | | | An | O1 | In | (S1) |
| I1 | (S2) | An | An-1 | O2 | In-1 | (S1) |
| I2 | (S2) | An-1 | A.... | O...... | I... | (S1) |
| I... | (S2) | A.... | A2 | On-1 | I2 | (S1) |
| In-1 | (S2) | A2 | A1 | On | I1 | (S1) |
| In | (S2) | A1 | | | | |
| | | | A1 | O1 | In | (S2) |
| I1 | (S3) | A1 | A2 | O2 | In-1 | (S2) |
| I2 | (S3) | A2 | A.... | O...... | I... | (S2) |
| I... | (S3) | A.... | An-1 | On-1 | I2 | (S2) |
| In-1 | (S3) | An-1 | An | On | I1 | (S2) |
| In | (S3) | An | | | | |
| | | | An | O1 | In | (S3) |
| I1 | (S4) | An | An-1 | O2 | In-1 | (S3) |
| I2 | (S4) | An-1 | A.... | O...... | I... | (S3) |
| I... | (S4) | A.... | A2 | On-1 | I2 | (S3) |
| In-1 | (S4) | A2 | A1 | On | I1 | (S3) |
| In | (S4) | A1 | | | | |

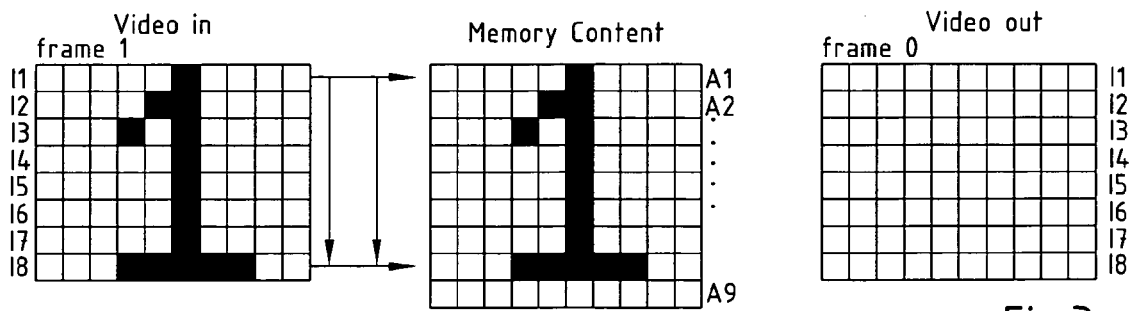
Fig.3a
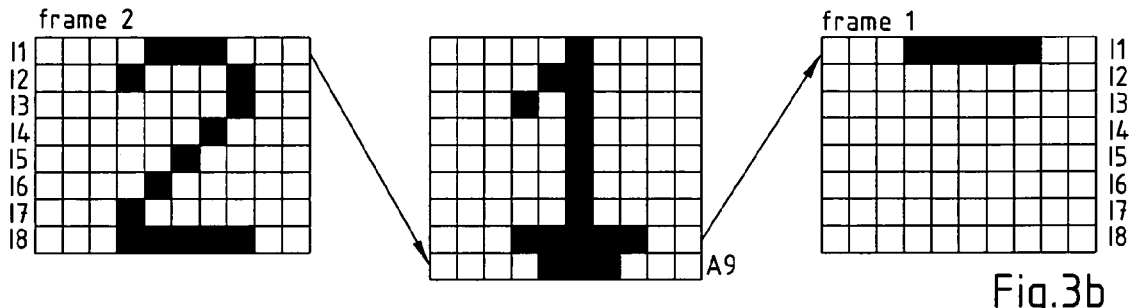
Fig.3b
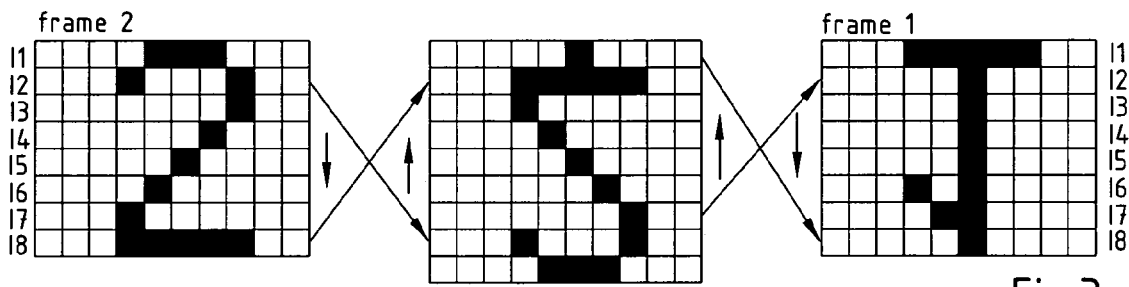
Fig.3c
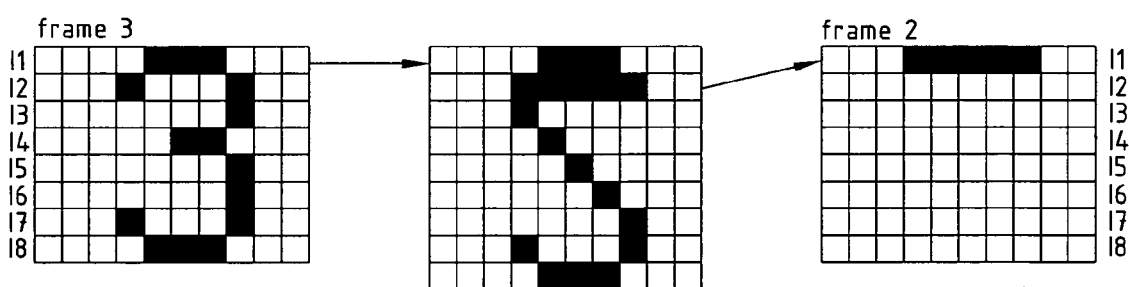
Fig.3d
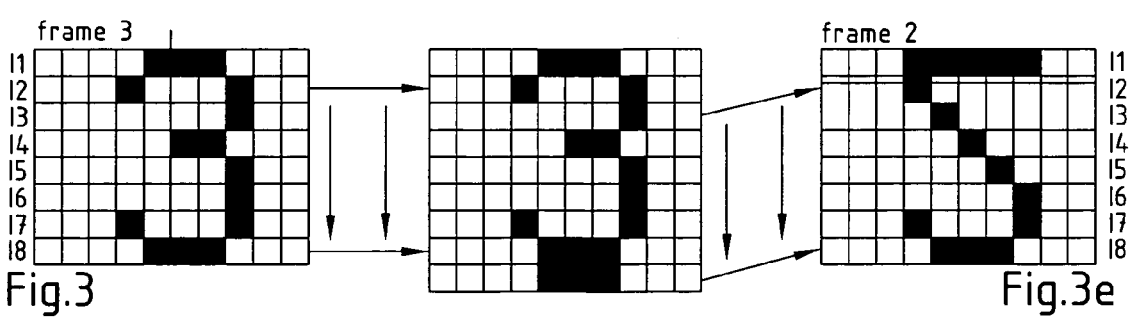
Fig.3
Fig.3e

METHOD, CIRCUIT ARRANGEMENT AND CAMERA FOR PROVIDING ELECTRONIC SCAN REVERSAL

FIELD OF THE INVENTION

This application claims the benefit, under 35 U.S.C. §119 of European Patent Application 05300160.8, filed Mar. 2, 2005.

The present invention relates to a method and a circuit arrangement for providing an electronic scan reversal of a video signal, which is useable in particular in a professional television camera or a video camera.

BACKGROUND

For a professional television camera, a normal chain of processing the video signal from scene-image to a display unit consists of the elements: optical lens unit, electronic pick-up elements, a video processing circuit coupled to the pick-up elements and a display unit. The lens unit projects the scene to be broadcasted horizontally and vertically in reversed order on the pick-up elements. The pick-up elements are readout sequentially in such a way that the horizontal and vertical position of the picture is reversed again to retain the normal picture. The video processing circuit generates from the raw data stream a signal useable for the display unit and provides in particular an output signal in accordance with a required video standard.

When a television camera is used with a lens unit, which is originally designed for film applications, a problem occurs. A film lens unit projects the scene in a non-reversed way on the pick-up element, in this case generally light sensitive film material. If such a lens unit is used with a television broadcast camera, the output signal of the respective pick-up elements has to be reversed horizontally and vertically.

A straightforward way to reverse an electronic picture is to use two electronic memories in which two complete pictures can be stored. For a continued picture reversal, a first picture is stored in the first memory. The second picture is stored in the second memory and simultaneously the first memory is readout in reversed order and sent to the output. When the second picture is stored in the second memory, then the first memory is available for the third picture. The third picture is then stored in the first memory, and at the same time the second memory is readout in reversed order, and so on for the subsequent pictures. This results in a continuous picture reversal for a video signal. Because professional cameras provide a video signal with a high resolution, a considerably large memory is required for a method of this kind.

Horizontal scan reversal methods and respective circuits are known for example from KR 9507034, JP 02260877, CA 2127608, JP 2158436 and JP 63019995.

SHORT SUMMARY OF THE INVENTION

The method for reversing a video signal having sequences of n elements comprises the steps of writing the n elements of a first sequence into memory locations of a memory in a non-reversed order and reading the memory locations in a reversed order, and in a subsequent step, writing the elements of a second sequence into the memory locations in a reversed order and reading the memory locations in a non-reversed order. The memory locations are readout from the memory in particular ahead of the write locations of the memory, for example one location or a few locations ahead of the write location. The memory capacity for the electronic scan reversal is therefore reduced.

In a first embodiment, the memory comprises n+1 memory locations, in which each one element can be stored, and when a first sequence of elements is stored into the memory locations 1–n, the first element of the next sequence is written into the memory location n+1. The subsequent elements of the next sequence are written into the memory locations n, n–1, n–2 and so on. Therefore, for this embodiment a memory of n+1 memory locations is sufficient for a video signal having sequences of n elements.

In a second embodiment, the memory comprises a memory capacity of n memory locations, and a break after each sequence of elements is utilized for the electronic scan reversal. After the sequence of n elements has been stored into the n memory locations, the last memory location is read during the break. When the first element of the next sequence arrives, this element is stored into the last memory location n, and the subsequent elements I2, I3, . . . are stored into the memory locations An–1, An–2, . . . , and therefore the memory location is readout always one element ahead of the write location of the memory. Hence, for this embodiment a memory capacity with n memory locations is sufficient for an electronic scan reversal of a video signal having sequences of n elements. The breaks after each sequence of elements are for example the horizontal flyback interval after a horizontal line or the vertical flyback interval after a vertical field or a picture frame.

The electronic scan reversal is made in the digital domain by a circuit arrangement comprising a microprocessor for reading and writing the elements into the memory locations of the memory. A circuit arrangement of this kind can be used in particular in a television camera comprising a lens unit, which is designed for film applications, or in professional studio equipment.

BRIEF DESCRIPTION OF THE DRAWINGS

Preferred embodiments of the invention are explained in more detail with regard to schematic drawings, which show.

DETAILED DESCRIPTION OF PREFERRED EMBODIMENTS

Figures 1, 2:
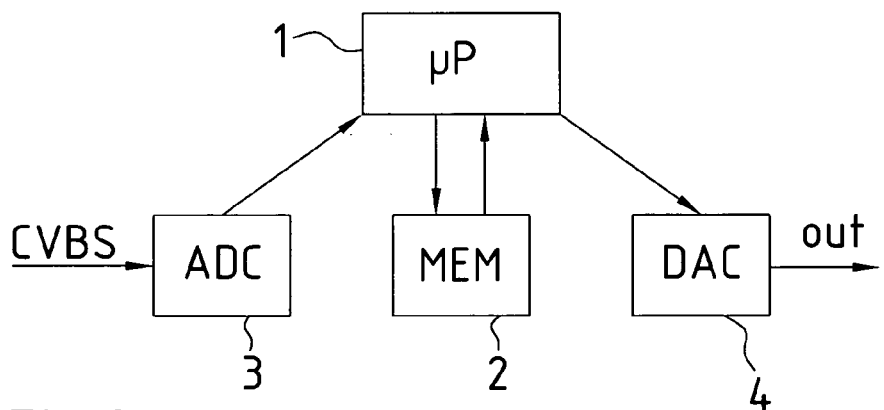
FIG. 1 a table with input and output operations for providing an electronic scan reversal by means of a memory, FIG. 2 a circuit arrangement comprising a memory for performing an electronic scan reversal, and FIG. 3 picture frames for illustrating a vertical scan reversal.

In FIG. 1 a table is shown for illustrating an electronic scan reversal of a video signal by means of a memory. The video signal contains sequences S1, S2, . . . of n elements I1-In each, the elements corresponding for example to a horizontal line or a to picture pixel. The sequences comprise each the same number of elements with the same format, corresponding for example to a digitized analog video signal, i.e. a CVBS video signal according to the PAL standard. The memory comprises n memory locations A1-An, in which each one of the elements I1-In can be stored. The memory is arranged in a manner, that at the same time into one memory location can be written and from another memory location can be read.

In the first column of the table input sequences S1-S4 of a video signal are shown, comprising each n elements I1-In. The n elements I1-In of the sequence S1 are written into the memory locations A1-An of the memory in a non-reversed order and are read out from the memory locations A1-An in a reversed order, and in a subsequent step, the elements I1-In of the sequence S2 are written into the memory locations A1-An of the memory in a reversed order and are read out from the memory locations A1-An in a non-reversed order, for providing an electronic scan reversal for the elements of the sequences S1, S2, and correspondingly for the subsequent sequences, as explained in more detail below.

It is known that the visible content of a video signal comprises periodic breaks after each horizontal line, also after each vertical field in case of an interlaced picture display or after each frame in case of a progressive display. The breaks are arranged in particular for providing sufficient time for flyback deflections in a cathode ray tube. By utilizing the breaks, a memory with n locations is sufficient for a scan reversal of a video signal with sequences of n elements.

In a first step, the elements I1-In of the first sequence S1 of a present video signal are written into the memory locations A1-An, as shown in column 2 of the table. Then, after the input element In has been stored in the memory location An, the break occurs. During this break, the memory location An is read for providing an output element O1, as shown in columns 3 and 4 of the table, the output element O1 providing a value corresponding to the last element In of the first sequence S1, as shown in column 5.

After the break, the first element I1 of the second sequence S2 arrives, which is then stored in the memory location An. During the same time, when this element I1 is being stored, the memory location An-1 is read, for providing a second output element O2 having the value In-1 of the first sequence S1. Therefore, when the element I1 of the second sequence S2 is written into the memory location An, the memory location An-1 is available for the next write operation, and in this memory location then the second element I2 of the sequence S2 is stored. At the same time, when this element is stored in the memory location An-1, the memory location An-2 is readout for providing an output element O3 having the value In-2 of the sequence S1. This procedure is performed also for the subsequent elements I3-In of the sequence S2, and when the sequence S2 is written completely into the memory locations An-A1, the first sequence S1 has been outputted via the output elements O1-On with the elements In-I1 being in reversed order.

A corresponding procedure takes place for the third sequence S3 having input elements I1-In. During the break between the sequences S2 and S3, the memory location A1 is read out for providing an output element O1 having the value In of the second sequence S2. When the first element I1 of the sequence S3 arrives, this element is stored then in the memory location A1. At the same time, the memory element A2 is read out for providing an output element O2 having the content In-1 of the sequence S2. In the next step, the input element I2 of sequence S3 is written into memory location A2, and at the same time, the memory location A3 is read for providing the element In-2 of the sequence S2.

This procedure continues until the last element In of the sequence S3 is written into the memory location An. At that time, the second sequence S2 with input elements I1-In has been outputted in a reversed order.

Also the next sequence S4 and the further sequences of the video signal are processed in this manner, for reversing the elements of each sequence. The first element I1 of the sequence S4 is stored in the memory location An and so on, in correspondence with the steps of the second sequence. Therefore, by utilizing a break between each sequence of elements, with the method of writing n elements of a sequence in memory locations of a memory in a non-reversed order and reading out the memory locations in a reversed order, and writing the elements of the next sequence into the memory locations in a reversed order and reading out the memory locations in a non-reversed order, a memory with n memory locations is sufficient for providing a scan reversal for a respective video signal.

Each element corresponds for example to a horizontal line and each sequence to a frame of a video signal. In this case, each memory location A1-An has a memory capacity for storing the content of a horizontal line. The electronic scan reversal as explained with regard to the table of FIG. 1 provides in this case a vertical inversion of the picture with an upside down display.

In another embodiment, each sequence S1-Sn corresponds to a horizontal line, and the elements I1-In represent the digital pixel values of each respective line. In this case, the electronic scan reversal provides a mirror image of the pictures.

The memory operations are performed in particular by means of a microprocessor 1, which operates with a memory 2, to which the microprocessor 1 is coupled, as shown in FIG. 2. The circuit arrangement of FIG. 2 comprises further an analog-to-digital converter 3 (ADC) and a digital-to-analog converter 4 (DAC), for providing an electronic scan reversal.

As an illustrative embodiment, a CVBS video signal is applied to the input of the ADC 2 for digitising the analog video signal. The digital data stream of the ADC 2 is coupled to the processor 1, which performs read and write operations of the data by means of the memory 2, using the method as explained with regard to FIG. 1, or as explained with regard to FIG. 3, as explained below. The output data, as received by the microprocessor 1 from the memory 2, are transmitted to the DAC 4, which provides an analog video signal OUT having an electronic scan reversal, in this embodiment a reversed CVBS signal.

A vertical scan reversal of a video signal is explained now with regard to FIG. 3, by using a simplified video signal. The video signal as shown in the first picture of the FIGS. 3a-3e has frames with sequences of eight horizontal lines I1-I8 each as the lements, the horizontal lines having each ten pixel values with picture content. The first frame of the video input signal, shown in the first picture of the FIG. 3a, represents the number "1".

In this embodiment, the memory comprises nine memory locations A1-A9 as shown in the second column of FIG. 3, each memory location having the capacity for storing the pixels 1-10 of one horizontal line of the video input signal. In the first column of FIG. 3, the video input signal with frames 1-3 is illustrated, and in the third column of FIG. 3 the respective video output signal is illustrated. The frames 1, 2 and 3 of video input signal have as the picture content a number in a non-reversed display, the numbers "1", "2" and "3", as shown in the first column.

For providing a vertical scan reversal, the lines I1-I8 of the first frame are stored in a first step in the memory locations A1-A8 of the memory in a non-reversed order, as shown in FIG. 3a. The frame 2 of the video signal represents the number "2", as shown in FIG. 3b. When the first line I1 of the frame 2 arrives, this line is stored in memory location A9 of the memory. During that time, the memory location A8 is readout for providing as an output signal the last line 8 of the frame 1, as shown in FIG. 3b, last column.

The memory location A8 is therefore available for the next storage operation. In the next step, line I2 of frame 2 is stored into memory location A8 and at the same time memory location A7 is readout for providing as an output signal line 7 of frame 1, as shown in FIG. 3c. In the next steps, the lines I3, I4 . . . to I8 of frame 2 are stored in memory locations A7, A6 . . . A2 of the memory and at the same time the memory locations A6, A5 . . . A1 are readout for providing as an output video signal a first frame 1 with lines I1-I8, comprising the horizontal lines of the frame 1 of the video input signal in a vertically reversed order, as shown in the third column of FIG. 3*c*.

The frame 3 of the input video signal with the number "3" is shown in the first column of FIG. 3*d*. The line I1 of frame 3 is stored in a next step in memory location A1 of the memory and at the same time memory location A2 is read out for providing the first horizontal line of the frame 2 of the video output signal, shown in the third column of FIG. 3*d*.

The subsequent lines I2-I8 of frame 3 are then stored in memory locations A2-A8, FIG. 3*e*, and at the same time the memory locations A3-A9 are read out in advance of the write operations, for providing frame 2 of the video output signal, having the vertically reversed content of frame 2 of the video input signal, shown in the third column of FIG. 3*e*. Hence, when frame 3 is stored in the memory, frame 2 of the video output signal is available. The memory operations for frame 3 of the input signal correspond therefore to the memory operations of the frame 1, as explained with regard to FIGS. 3*a* and 3*b*.

The frame 4 of the video input signal is processed in the same way as frame 2, and the subsequent frames are processed accordingly. As can be seen, the horizontal lines of the frames are stored in the memory alternatingly in a non-reversed and a reversed order, and the read operations are performed correspondingly in a reversed and a non-reversed order.

When reading out the memory locations ahead of the write locations, for example one location or a few locations ahead of the write location, a memory with the capacity for storing one sequence is sufficient, when utilizing a break, for example a horizontal blanking at the end of a line, or a vertical blanking of a field or of a frame, after each sequence. The method can be used in particular for CVBS video signals, for component signals or even RGB signals in accordance with a given television standard.

The circuit arrangement as shown in FIG. 2 can be used in particular within a television broadcast camera, which comprises a lens unit and an optical sensor connected to the lens unit, which is originally designed for film application. The circuit arrangement allows therefore a vertical and/or a horizontal scan reversal, for providing a camera output signal having a correct picture display in accordance with a wanted television standard. A circuit arrangement of this kind may be used also for professional studio equipment for providing postproduction or trick effects. But other applications are also possible for those skilled in the art without departing from the scope of the present invention.

The invention claimed is:

1. Method for reversing a video signal having sequences of n elements corresponding to picture pixels of horizontal lines, comprising the steps of
   writing the n elements of a first sequence into memory locations of a memory in a non-reversed order and reading out the memory locations in a reversed order, wherein said memory comprises a memory capacity for n elements, and wherein for a horizontal scan reversal the writing of the n elements into said memory locations is reversed after a horizontal blanking of a line such that in a further step,
   writing the n elements of a second sequence into the memory locations in a reversed order and reading out of the memory locations in a non-reversed order.

2. Method according to claim 1, further comprising the step of reading out the memory locations from the memory at least one location ahead of the write memory location.

3. Method for reversing a video signal having sequences of n elements, comprising the steps of
   writing the n elements of a first sequence into memory locations of a memory in a non-reversed order and reading out the memory locations in a reversed order, wherein said memory comprises a memory capacity for n+1 elements and in a further step,
   writing the n elements of a second sequence into the memory locations in a reversed order and reading out the memory locations in a non-reversed order, by writing the first element of the second sequence into the n+1 memory location, and writing the, second element of the second sequence of elements into the n memory location, wherein the memory location of the first sequence is read out at least one memory location ahead from the write memory location of the second sequence.

4. Method for reversing a video signal having sequences of n elements, comprising the steps of
   writing n elements of a first sequence into memory locations of a memory in a non-reversed order,
   reading the memory locations in a reversed order beginning with the last memory location for providing n output elements with the content of the first sequence in a reversed order,
   writing n elements of a second sequence into the memory locations in a reversed order beginning with the last memory location, the writing having a delay of one element with regard to the reading of the respective memory location,
   reading the memory locations with the content of the second sequence in a non-reversed order, beginning the read-out with the first memory location for providing n output elements with the content of the second sequence in a reversed order,
   writing and reading n elements of a third sequence into the memory locations in correspondence with the writing and reading of the n elements of the first sequence, and
   writing and reading n elements of a fourth sequence into the memory locations in correspondence with the writing and reading of the n elements of the second sequence.

5. Method in accordance with claim 4, wherein a sequence of input elements corresponds to one of a horizontal line or to a vertical field or a frame, and that a blank after one of each line or respectively each field or frame is utilized for reading the elements one memory location ahead of the respective write location.

6. Method in accordance with claim 4, wherein said memory comprises n+1 memory locations for storing n elements of a respective sequence, a first sequence of n elements being stored in the first n memory locations and the first element of the next sequence being stored in the memory location n+1 for providing a readout of the memory locations one element ahead of the write locations.

7. Circuit arrangement comprising a microprocessor and a memory, for performing a method in accordance with claim 1.

8. Camera comprising a lens unit, an optical sensor connected to the lens unit, and a circuit arrangement in accordance with claim 7.

9. Camera in accordance with claim 8, wherein the camera is a television broadcast camera combined with a lens unit designed for movie applications, and that the circuit arrangement provides a horizontal scan reversal for the video output signal.

10. Circuit arrangement comprising a microprocessor and a memory, for performing a method in accordance with claim 3.

11. Camera comprising a lens unit, an optical sensor connected to the lens unit, and a circuit arrangement in accordance with claim 10.

12. Camera in accordance with claim 11, characterized in that the camera is a television broadcast camera combined with a lens unit designed for movie applications, and that the circuit arrangement provides a horizontal scan reversal for the video output signal.

* * * * *